(12) United States Patent
Hagg

(10) Patent No.: US 9,019,202 B2
(45) Date of Patent: Apr. 28, 2015

(54) DYNAMIC VIRTUAL REMOTE TAGGING

(75) Inventor: Wilhelm Hagg, Korb (DE)

(73) Assignee: SONY Corporation, Tokyo (JP)

(*) Notice: Subject to any disclaimer, the term of this patent is extended or adjusted under 35 U.S.C. 154(b) by 579 days.

(21) Appl. No.: 13/359,651

(22) Filed: Jan. 27, 2012

(65) Prior Publication Data

US 2012/0212460 A1   Aug. 23, 2012

(30) Foreign Application Priority Data

Feb. 23, 2011  (EP) ..................................... 11001505

(51) Int. Cl.
G09G 5/00 (2006.01)
G06F 17/30 (2006.01)

(52) U.S. Cl.
CPC .... *G06F 17/30997* (2013.01); *G06F 17/30017* (2013.01); *G06F 17/30* (2013.01); *G06F 17/30967* (2013.01)

(58) Field of Classification Search
None
See application file for complete search history.

(56) References Cited

U.S. PATENT DOCUMENTS

| 6,388,755 | B1 | 5/2002 | Zhao et al. | |
| 7,106,357 | B2* | 9/2006 | Fukuda et al. | 348/14.02 |
| 7,996,015 | B2* | 8/2011 | Bloebaum | 455/456.1 |
| 2004/0140956 | A1 | 7/2004 | Kushler et al. | |
| 2004/0189720 | A1 | 9/2004 | Wilson et al. | |
| 2005/0091268 | A1 | 4/2005 | Meyer et al. | |
| 2008/0036570 | A1 | 2/2008 | Kim et al. | |
| 2011/0279478 | A1* | 11/2011 | Bitra | 345/633 |
| 2012/0127302 | A1* | 5/2012 | Imai | 348/135 |

FOREIGN PATENT DOCUMENTS

WO   WO 2010046123 A1 * 4/2010

* cited by examiner

*Primary Examiner* — Jason Olson
(74) *Attorney, Agent, or Firm* — Oblon, McClelland, Maier & Neustadt, L.L.P.

(57) ABSTRACT

Method for selecting content items, comprising determining a location in a space, the location depending on at least one of a position, an orientation or a movement of a selection device in a real world environment surrounding the selection device; determining a virtual tag included in a set of virtual tags as a selected virtual tag, the selected virtual tag being associated with the determined location; and selecting a subset of content items of a set of content items, the subset of content items being associated with the selected virtual tag.

22 Claims, 17 Drawing Sheets

| A | B | C | D |   |   |
|---|---|---|---|---|---|
| E | F | G | H |   |   |
| I | J | K | L | M | N |
| O | P | Q | R | S | T |
| U | V | W | X | Y | Z |

Fig. 11

DYNAMIC VIRTUAL REMOTE TAGGING

An embodiment of the invention relates to a method for selecting content items, e.g. from an electronic storage. Further embodiments of the invention relate to a system for selecting content items and to a device for selecting content items.

BACKGROUND

Nowadays, electronic storage has become affordable, such that many consumers use mass storage devices for electronically saving content items, e.g. multimedia data including music, video, and image data. However, even though an electronic storage may easily be searched, it may be difficult to select and/or memorize a storing location of a content item. Thus, there is a need for a method for accessing an electronic storage, facilitating organization and retrieval of content.

It is therefore an object of the invention to provide an easy to use method for storing and/or accessing content items in an electronic storage.

This object is solved by a method, a system, and a device according to the independent claims.

Further details of the invention will become apparent from the consideration of the drawings and the ensuing description.

BRIEF DESCRIPTION OF THE SEVERAL VIEWS OF THE DRAWINGS

The accompanying drawings are included to provide a further understanding of embodiments and are incorporated in and constitute part of this specification. The drawings illustrate embodiments, and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 11 illustrates an easy to memorize arrangement of the alphabetic characters for the embodiment of FIG. 11.

DETAILED DESCRIPTION

In the following, embodiments of the invention are described. It is important to note that all described embodiments may be combined in any way, i.e. that there is no limitation that certain described embodiments may not be combined with others. Further, it should be noted that same reference signs throughout the Figures denote same or similar elements.

It is further to be understood that other embodiments may be utilized and structural or logical changes may be made without departing from the scope of the invention. The following detailed description, therefore, is not to be taken in a limiting sense, and the scope of the present invention is defined by the appended claims.

It is to be understood that the features of the various embodiments described herein may be combined with each other, unless specifically noted otherwise.

Figure 1:
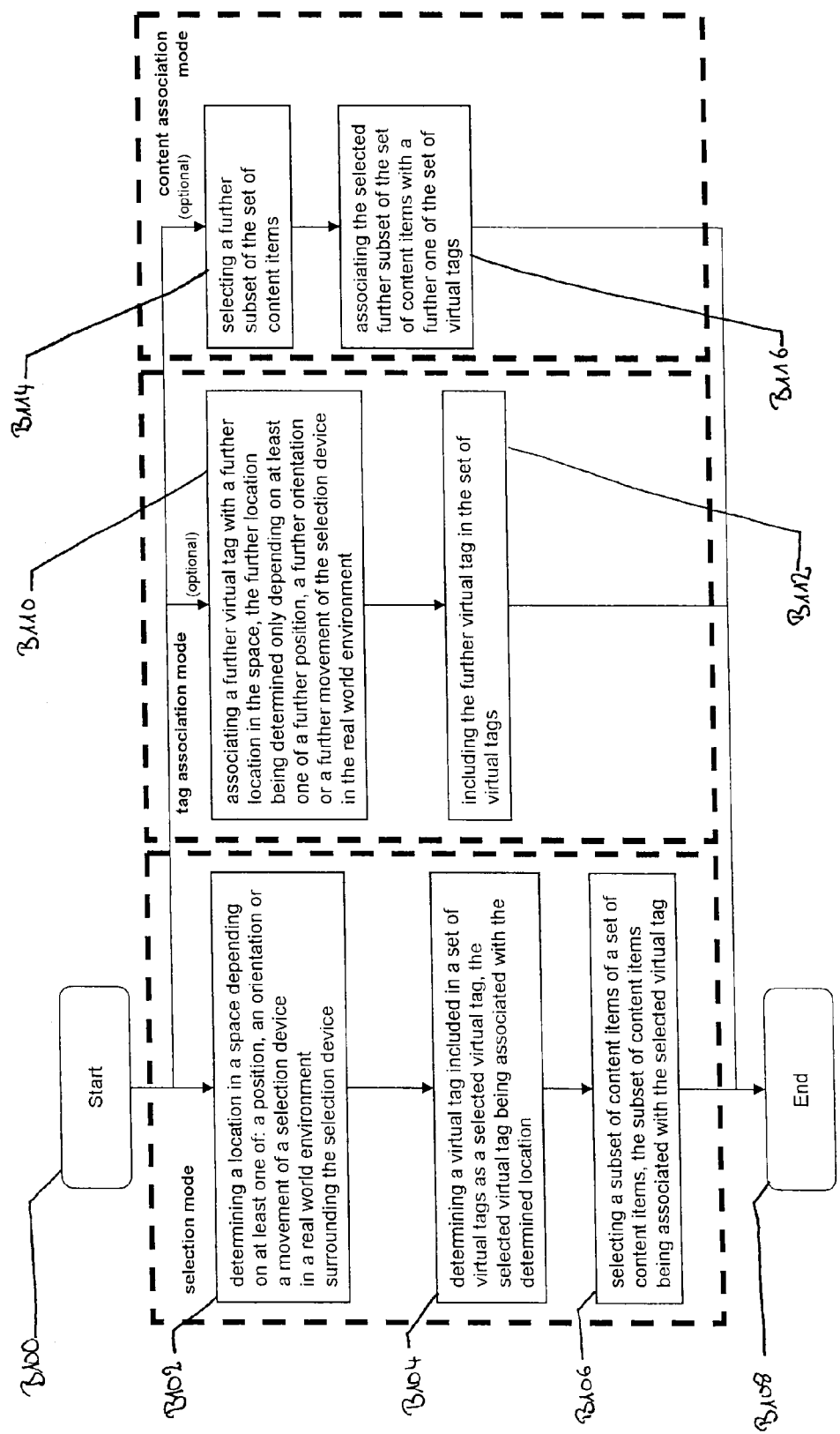
FIG. 1 illustrates an embodiment of a method for selecting and/or associating content items.

In FIG. 1, an embodiment of a method for selecting content items is illustrated. At B100, the method may start, e.g. upon a user's request, such as a user's action that may be interpreted as a command directed to a device implementing the method.

At B102, a location is determined in a space. The location may depend on at least one of a position, an orientation or a movement of a selection device, the movement of the selection device taking place in a real world environment surrounding the selection device.

The space may be any kind of expanse, environment and/or area having for example two or three dimensions. Thus, the space may be defined by a two-dimensional map or by a three-dimensional surrounding. It may or may not correspond to the real world environment surrounding the selection device. If for example the selection device is being used in a real-world living room, the space may correspond to the living room, and the locations may correspond to corners, pieces of furniture, devices or any other real world object in this living room. Alternatively, the space may also be virtually defined and therefore not correspond to the real world environment, i.e. the living room. The space may be defined as e.g. a map or two-dimensional organization scheme, or as a three-dimensional virtual library including a number of bookshelves arranged within the virtual library at various positions, colors and/or labels.

The location in the space may correspond to any position or site in the space. It may therefore e.g. be defined by parameters in a coordinate system spanning the space. Further, the location may also be described by an object e.g. having a predefined position in the space. For example, if the space is a (real-world or virtual) living room, the location may be defined by a bookshelf or another piece of furniture of this living room.

The location in the space may depend on at least one of a position, an orientation, or a movement of the selection device in the real world environment. This holds true in both cases, e.g. if the space corresponds or does not correspond to the real world environment. Thus, even if the space is a virtual environment, the location may depend on the position, the orientation and/or the movement of the selection device in the real world environment.

The position, orientation or movement of the selection device may be determined by use of gyroscope, measuring acceleration in different directions of the real-world environment. Other more simple types of acceleration sensors, such as mechanical sensors, may also be used. Further, infrared transmitters and receivers and/or cameras may be used for orientation detection. Still further, also an input from external systems enabling position detection, such as GPS (global positioning system), may be used. The detected position, orientation and/or movement of the selection device in the real world environment may then be used for determining the location in the space.

If the space corresponds to the real world environment, the location may correspond to the position, orientation, and/or movement of the selection device. Alternatively, if the selection device is adapted to point at a position and/or an object, i.e. by use of a light beam, the location may also correspond to the position or object to which the selection device points. Still further, more sophisticated methods for determining the location are also possible. For example, an object may be defined at the location by drawing a circle with a selection device having a pointing facility around the object, or by highlighting and/or illuminating the object with a diffuse light beam.

If the space however corresponds to a virtual environment, the information concerning the position, orientation and/or movement of the selection device in the real world environment may be used for determining the location in the virtual environment. For example, the information may be interpreted in the virtual environment. Thus, a coordinate based description of the position, orientation or movement may e.g. be transformed to a coordinate system spanning the virtual environment. The position, orientation or movement of the selection device in the real world environment may therefore be interpreted in terms of a position, orientation or movement within the virtual environment, and may thus be used for defining the location in the virtual environment, e.g. in an analogue manner as pointed out for the real world environment. Thus, the location may be determined by the position of the selection device within the real world environment, which has been transformed into coordinates of the space. Further, the selection device may also be interpreted as a pointing device for pointing to the (virtual) location within the (virtual) space, and the location may thus be defined by interpreting the pointing direction of the selection device within the space. Also within the virtual space, the more sophisticated for location identifying methods may be applied, i.e. it is possible to encircle a (virtual) object in the (virtual) space by real world positioning or movement of the selection device.

At B104, a virtual tag included in a set of virtual tags is determined as a selected virtual tag, the selected virtual tag being associated with the determined location. Thus, it may be assumed that a set of virtual tags exist, which virtual tags may be associated with the locations. These tags may be virtually defined within an electronic storage, e.g. by variables being defined in the electronic storage.

It should be noted that these virtual tags are not physically associated with, e.g. physically applied to, the determined location. They further do not appear within the space, neither if corresponding to the real world environment, nor if corresponding to the virtual environment. Thus, only a virtual association is realized, e.g. by a variable in an electronic storage.

The set of virtual tags may be stored within the electronic storage, and associated with the determined location within the electronic storage, e.g. by a variable realizing the virtual tag and including an electronic description of the determined location. In an alternative embodiment, the electronic storage may include an electronic representation of each of the virtual tags of the set and further electronic representations of the locations. In this case, a virtual tag may be associated with a location e.g. by means of a pointer, the pointers being organized e.g. in a relational database. Thus, no physical tag assignment in the real world environment or visualized tag assignment in the virtual space is needed.

At B106, a subset of a set of content items may be selected, the subset of content items being associated with the selected virtual tag. It may thus be assumed that a set of content items is accessible. It may further be assumed that with respective virtual tags, respective subsets of the set of content items may be associated. The subset of content items associated with the selected virtual tag may thus be selected by means of evaluating respective associations.

The content items may include any items including content. For example, the content may include any kind of multimedia data, e.g. videos, music pieces, photos, electronic books, internet links, phonebook entries and/or working files or folders. These items may be stored in a content storage, e.g. an electronic storage.

The association between a respective virtual tag and a respective subset of content items may be realized electronically. For example, with each virtual tag, a set of pointers pointing to each of the content items of the subset may be stored. For example, the association may be stored within tables of the relational database.

At B108, the embodiment of the method may terminate, e.g. while waiting for further commands to be entered.

Summarizing blocks B102 to B106, it should be noted that departing from a position, orientation, and/or movement of the selection device in the real world environment, the location in the space, for example the real world environment or virtual environment may be selected. Based on the location, the virtual tag virtually associated with the determined location may be determined. It should be noted that the determining of the virtual tag may be performed without any knowledge of the user, e.g. on the fly after the movement of the selection device within the real world environment. Based on virtual tag, the subset of content items associated with the virtual tag may be selected. The selected subset may be presented to the user e.g. on a display for a further selection e.g. for consumption. For example, the user may select a film, a collection of photos, a playlist or the like from the subset of content items for consumption, e.g. playback. Alternatively, if the subset of the content items includes only one single content item, the single content item may be instantly presented to the user, i.e. played to the user.

In an alternative embodiment, the content items may also include commands to be executed by electronic devices. For example, if the user points to the sofa in his living room environment, the set of content items may include a command directed to a lightning system for switching on a homely light, and further a command directed to an audio device for playing back a playlist of relaxing music. Further, also more sophisticated actions may be performed, e.g. when the user points to a picture on the wall including his photo, the content item selected may include an enrollment command for a home entertainment system, enabling the home entertainment system to load, from the storage, the user's personal profile, the user's preferred music, the user's preferred videos or the like. It is thus possible that with a simple real world movement of the selection device, complex actions may be requested and carried out.

As becomes clear from this example, the assignment of content items with locations may help the user to easily memorize, request and/or access e.g. complex commands. It is thus possible to provide a sophisticated user interface based on associations which are easy to memorize within the human cognitive structures. For this, a spatial orientation is used for which the human mind is particularly disposed.

For enabling the user to personally associate tags with locations, the embodiment of the method depicted in FIG. 1 may further optionally allow the user at B110 to associate a further virtual tag with the further location in the space. Again, the further location in the space may be determined depending on at least one of a further position, a further orientation or a further movement of the selection device in the real world environment.

The further virtual tag may be included in the set of virtual tags, as illustrated at B112. The user may thus define locations in the space to be associated with further virtual tags for later retrieval of content items. For example, the user may determine locations which are of particular interest to him, as will be pointed out in more detail below. For example in a real world or virtual environment, the user may associate tags to characteristic objects helping him or her to memorize associations at a later point in time.

In the embodiment, the user may further optionally be enabled to select a further subset of the set of content items, as illustrated at B114. For example, when browsing the content of the content storage e.g. at a display, the user may highlight and/or select the further subset of the set of content items. For this, the selection and/or another input device may be used.

At B116, the selected further subset of the set of content items, which have e.g. been highlighted at the display at B114, may be associated with a further one of the set of virtual tags, e.g. with one of the tags that have been newly defined at B110, B112.

If the further one of the set of the virtual tags has been assigned with a location, the association of the further subset of the set of content items may be particularly easy for the user. For example, after having selected the further subset of the set of content items, the user may determine the location as described at B102. Then, the virtual tag assigned to the location may be used for associating the selected further subset of the set of content items. Using the selection device, this may correspond to a "drag and drop" of the e.g. highlighted further subset of content items to the location using the selection device. Thus, the association of content items to locations becomes particularly easy.

It should be noted that branch B102 to B106 describes a "selection mode" for selecting content items on the basis of a location in the space selected by the movement of the selection device in the real world environment. Further, branch B110, B112 describes a "tag association mode" which may be optionally included in the embodiment of the method, allowing the user to personally associate virtual tags with locations. Still further, branch B114, B116, which is further optional in the embodiment of the method, describes a "content association mode", in which a user is enabled to associate content, i.e. a subset of the set of content items, with one of the tags which may have been formerly associated with the location.

These modes may for example selected e.g. by using a key at the selection device. For example the selection mode may be normal mode used when a selection button is pressed after a movement of the selection device. Further, the tag association mode may be used when an association button is pressed after a movement of the selection device. The content association mode may be used when the selection button is pressed after a subset of the set of content items has been selected and the selection device has been moved to indicate a location.

Further, tag association as described at B110, B112 may also be performed implicitly whenever the user associates a selected further subset of the set of content items and then determines the location in the space to which no virtual tag has been associated so far. Thus, tag association may be performed implicitly, i.e. without being noted by the user.

For a example, a user being fond of Japanese culture, may select at a television set having access to a content storage including a large collection of videos, a set of films produced by Akira Kurosawa, and drag them with his selection device to a Japanese sword attached at his chimney. Thus, when desiring to select one of his Kurosawa films at a later point in time, the user may only select the Japanese sword with his selection device, upon which the titles of the films are being displayed at this television set, ready for consumption. Alternatively in this use case, the Japanese sword may also be included in a virtual environment, including objects that may help to memorize the scenes of films, such as the Japanese sword, a Snoopy poster and/or a model of a space craft.

Figure 2:
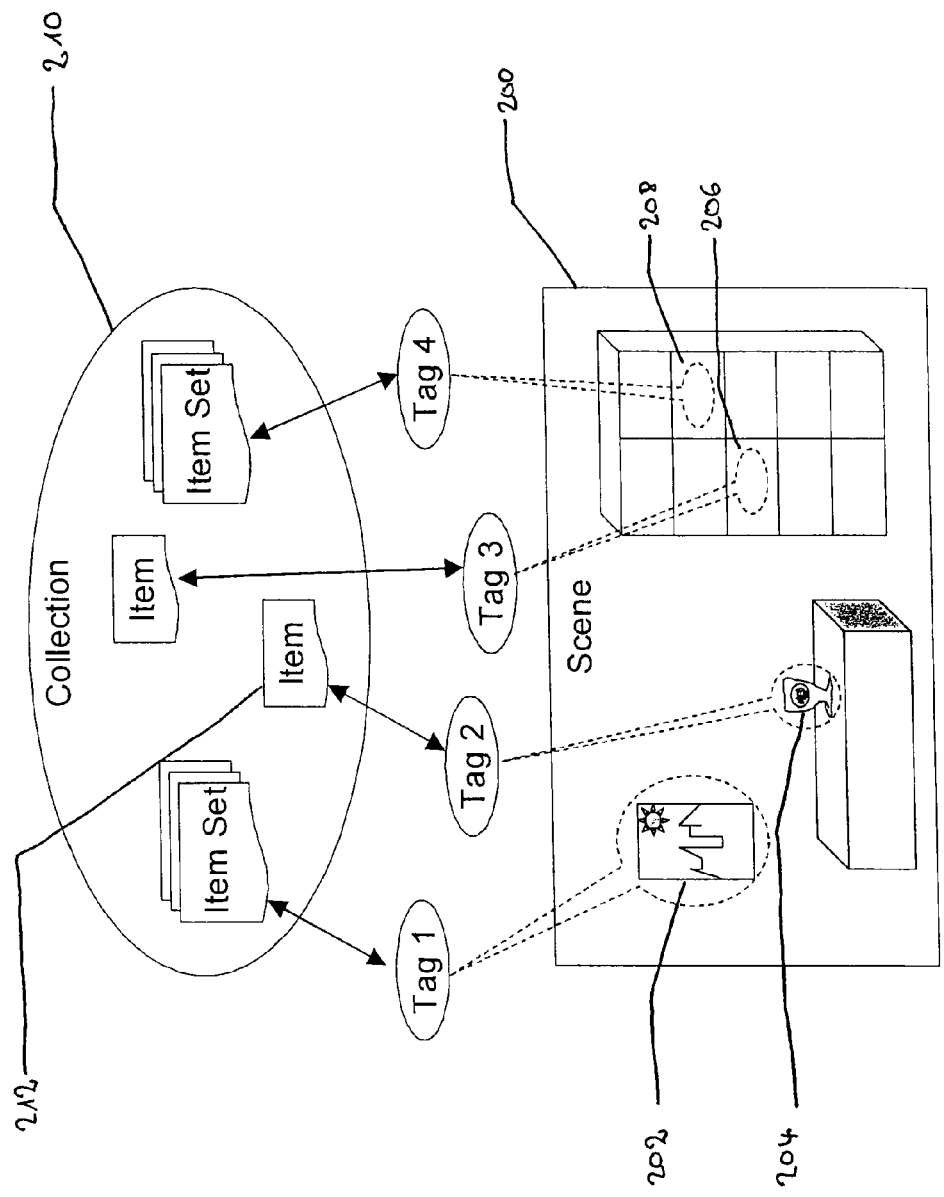
FIG. 2 illustrates relations between the entities within the embodiment shown in FIG. 1.

In FIG. 2, relationships between the entities of an embodiment of the method are depicted. At scene 200, different objects are visible, such as picture 202, goblet 204 and bookshelves 206 and 208. In the case depicted, these objects have been selected and respectively assigned to tags 1 to 4 e.g. within the "tag association mode" (B110, B112) of FIG. 1.

Further, a collection 210 of content items organized in a folder structure is given. In the case depicted, single content items and subsets of collection 210 have been associated with tags 1 to 4 e.g. in the "content association mode" (B114, B116) of FIG. 1.

Within the "selection mode" of FIG. 1, the user may now select e.g. goblet 104 associated with tag 2, which tag is associated with an item 212 from collection 210. Item 212 may be play back to the user e.g. on a TV set (not shown). Supposing that item 212 is a football game which has been associated with goblet 204, it becomes clear that the linking between locations, virtual tags and content items allows an easy to memorize content organization and access to the user.

Figure 3:
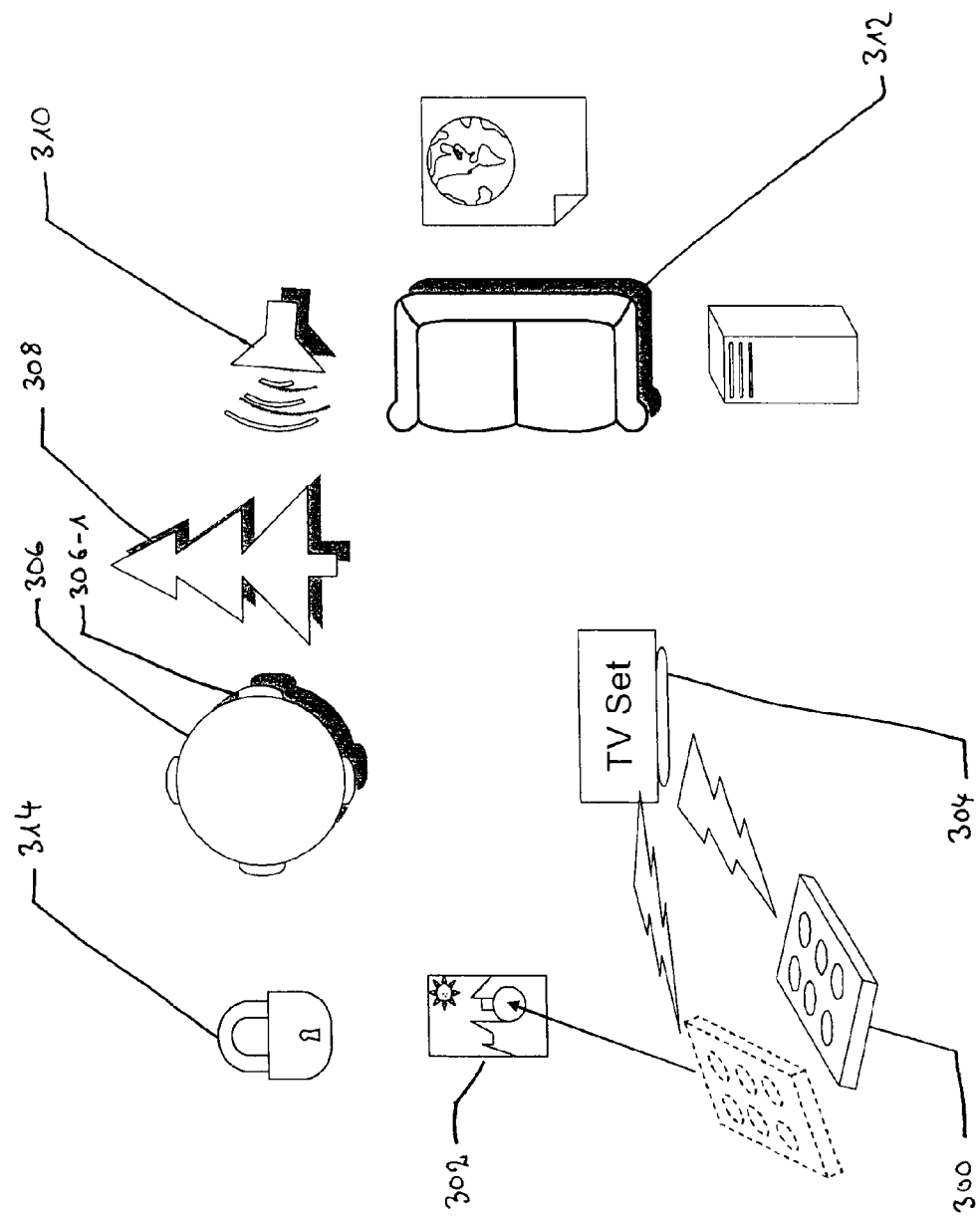
FIG. 3 illustrates an embodiment of a method for assigning virtual tags to real world or virtual objects.

FIG. 3 illustrates further use cases of an embodiment of the method within a real world or virtual living room environment. Selection device 300 may be assumed to have been firstly directed to a picture 302 and to have then been moved in a direction towards television set 304. Television set 304 may be assumed to include a display and further an access to the content storage.

Supposing that picture 302 shows the London skyline, the selecting of picture 302, e.g. according to the selection mode (B102 to B108) from FIG. 1, indicates a selection of a picture presentation including pictures of the city of London. The moving of selection device 300 towards television set 304 may indicate a dragging and dropping of the pictures to the television set, and may therefore be interpreted as a command for starting the playback. Thus, the selection of an object may involve a content selection and further a complex playback request.

Further, the selection of dinner table 306 within the (real world or virtual) space may indicate a request for the playback of a dinner music collection, the selection of Christmas tree 308, the selection of a collection of Christmas carols. Dragging and dropping from Christmas tree 308 to loudspeaker 310 may indicate the request to playback the Christmas carols, while dragging and dropping from Christmas tree 308 to television set 304 may indicate the playback of Christmas videos.

Further, the selection may also initiate more complex commands. The selection of a sofa 312 may indicate a request to dim down the light and to playback relaxing music. Further, the selection of a particular chair 306-1 may initiate an enrolment procedure of the person who is normally seated at this place. Still further, dragging and dropping content to a lock 314 or a safe may activate a parental control function for this content.

The tags associated with the locations or the content items associated with the tags may further depend on information related to the user and/or the real world environment surrounding the user. Thus, different virtual tags may be assigned with one single location, the virtual tag being selected depending on the further information. The association may thus be defined within different tag maps, each of which may be selected depending on the information related to the user and/or to the real world environment. The tag map may also be manually selected by the user, e.g. by pressing a corresponding button of the selection device.

For example, the virtual tags or content items associated with the locations may depend on the apparatuses switched on in the real world environment of the user. For example, if television set 304 is switched on, but the HiFi system is switched off, the selection of picture 302 showing the London skyline may initiate a playback of the photos taken at London, while when the TV set is switched off and the HiFi system is switched on, the selection of picture 302 may initiate the playback of a particular playlist of songs that the user has heard at his or her last London trip.

Further, the tags or content items associated with the locations (tag map) may also depend on a position of the user. For example, when the user is seated at sofa 312, the selection of the Christmas tree 308 may initiate the playback of a Christmas film, while when seated at diner table 306, the playback of Christmas music may be initiated upon such a request.

Further, the tags or content items associated with the locations (tag map) may also be dependent on the user's mood. Thus, if the selection device is aware of the user's mood, a more happy or more calm playlist of dinner music may be played back upon selection of dinner table 306.

Figure 4:
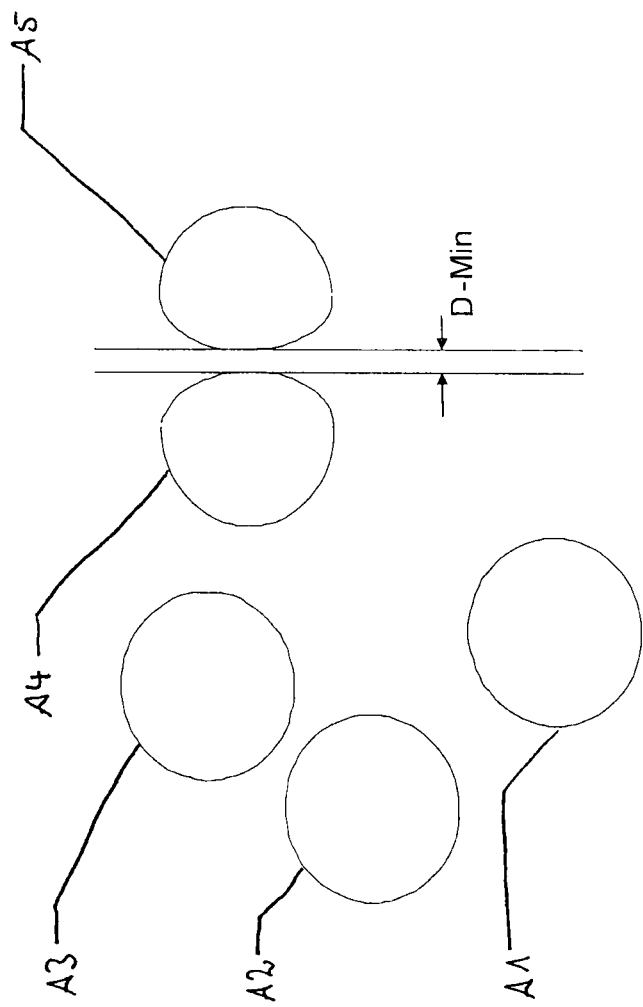
FIG. 4 illustrates a method for adapting tagging areas and/or activation areas when located closely together.

In FIG. 4, it is illustrated that the locations associated with the tags may be defined by areas surrounding the locations, e.g. to achieve a good usability within the "selection mode". Such areas, in the following also called activation areas, may be defined by a circle e.g. with a predefined radius around the location, e.g. the point in space to which the tag may be associated. However, if locations are closely located, the activation areas may intersect. Therefore, the activation areas may in this case be modified to achieve a maximum usability.

FIG. 4 shows activation areas A1 to A5 located in a two-dimensional space. However, A4 and A5 are located at a small distance, such that if these areas would be defined by circles with a predefined radius, these areas would intersect. Therefore, the activation areas may be modified by defining a minimum distance D-Min between the areas.

Figure 5:
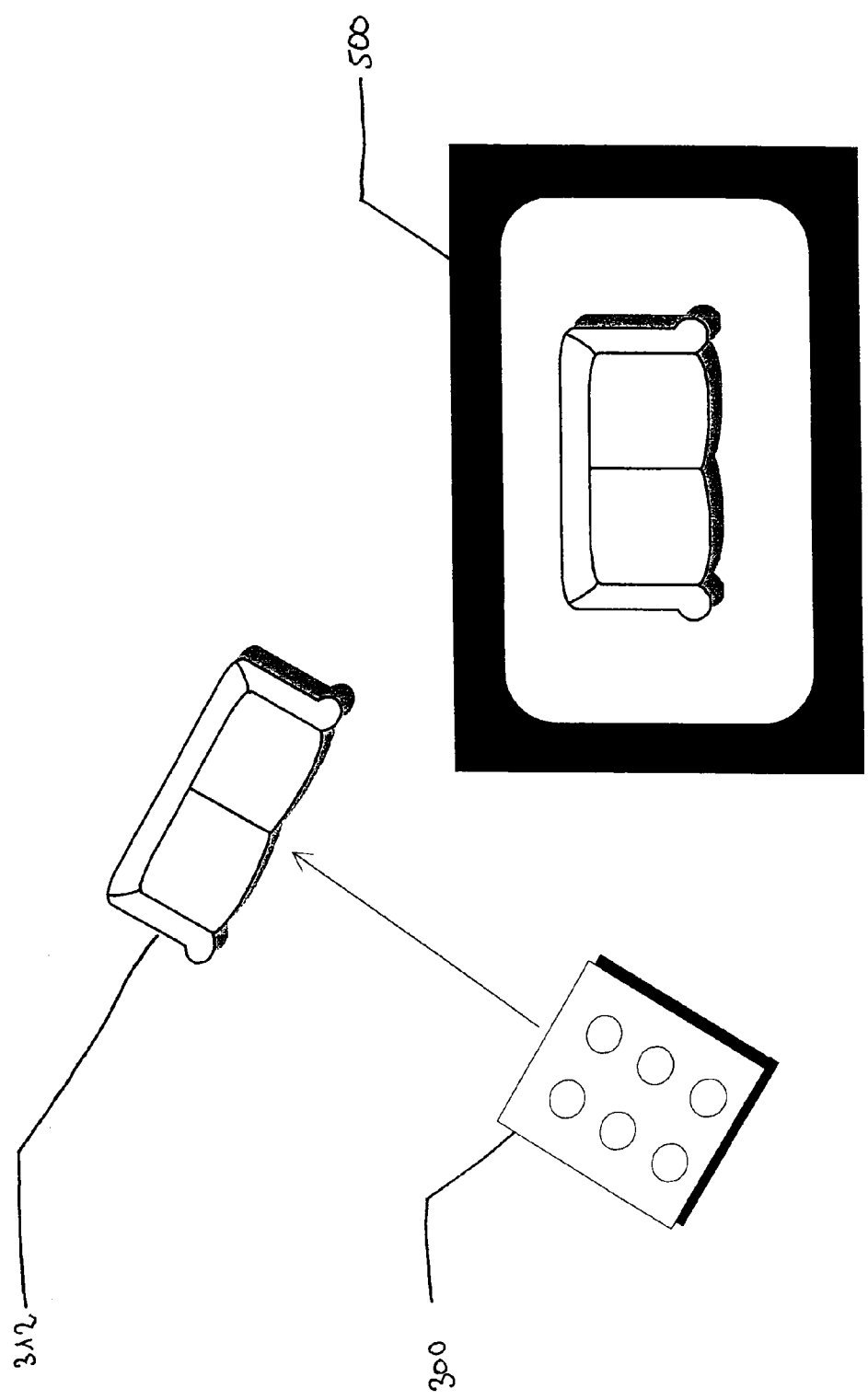
FIG. 5 illustrates a further embodiment of the method of FIG. 3 in which a selected location is displayed on a separate display.

FIG. 5 illustrates an embodiment of the method in which the location is determined in the real world environment depending on a pointing direction and/or on a focusing direction of the selection device, e.g. selection device 300 from FIG. 3.

In this embodiment, selection device 300 includes a light beam generator for illuminating the selected location in the pointing and/or focusing direction. For example, the selection device may include a laser beam generator for tagging, i.e. for associating virtual tags to locations e.g. within the "tag association mode" (B110, B112) of FIG. 1. The laser beam may used for pointing to the location or for surrounding the location or the object by the pointer. Thus, the activation range or its size may be defined by circles drawn by the laser pointer. Additionally or alternatively, the selection device may include a further light beam generator for generating a diffuse light for highlighting the whole activation range e.g. within the "selection mode" of FIG. 1.

For further enhancing usability, selection device 300 may output an optic, acoustic and/or haptic notification when a location associated with a respective virtual tag is identified by the position, the orientation and/or the movement of selection device 300. Thus, the user is made aware of the fact that he or she is now pointing to a tagged location to which content items may be associated.

As an optical indicator, selection device 300 may switch on one of the light beams, e.g. the laser light beam or the diffuse light beam. Alternatively or additionally, a sound indicator such as a short or low beep may be issued. Further additionally or alternatively, a tactile feedback signal may be issued, e.g. by a short vibration of selection device 300. The tactile feedback signal may be particularly helpful for closely interrelating real world environment and virtually assigned content items within the user's mind.

For further increasing usability, a selection display 500 may further be provided for displaying at least a part of the space, and for marking a selected location, e.g making the selected location visible to the user. The displayed part of the space and the marked location may depend on a movement, a tilt and/or a rotation of selection device 300.

If the space corresponds to the real-world environment of the user, as in FIG. 5, the image displayed at display 500 may for example be taken by a camera included in selection device 300. The location may then be determined depending on a focusing direction of the camera within the real-world environment.

If however the space does not correspond to the real-world environment, but to a virtual environment, the displayed part of this virtual environment and the location may also be determined based on a movement, a tilt and/or a rotation of selection device 300, and may also be displayed at display 500.

Figure 6:
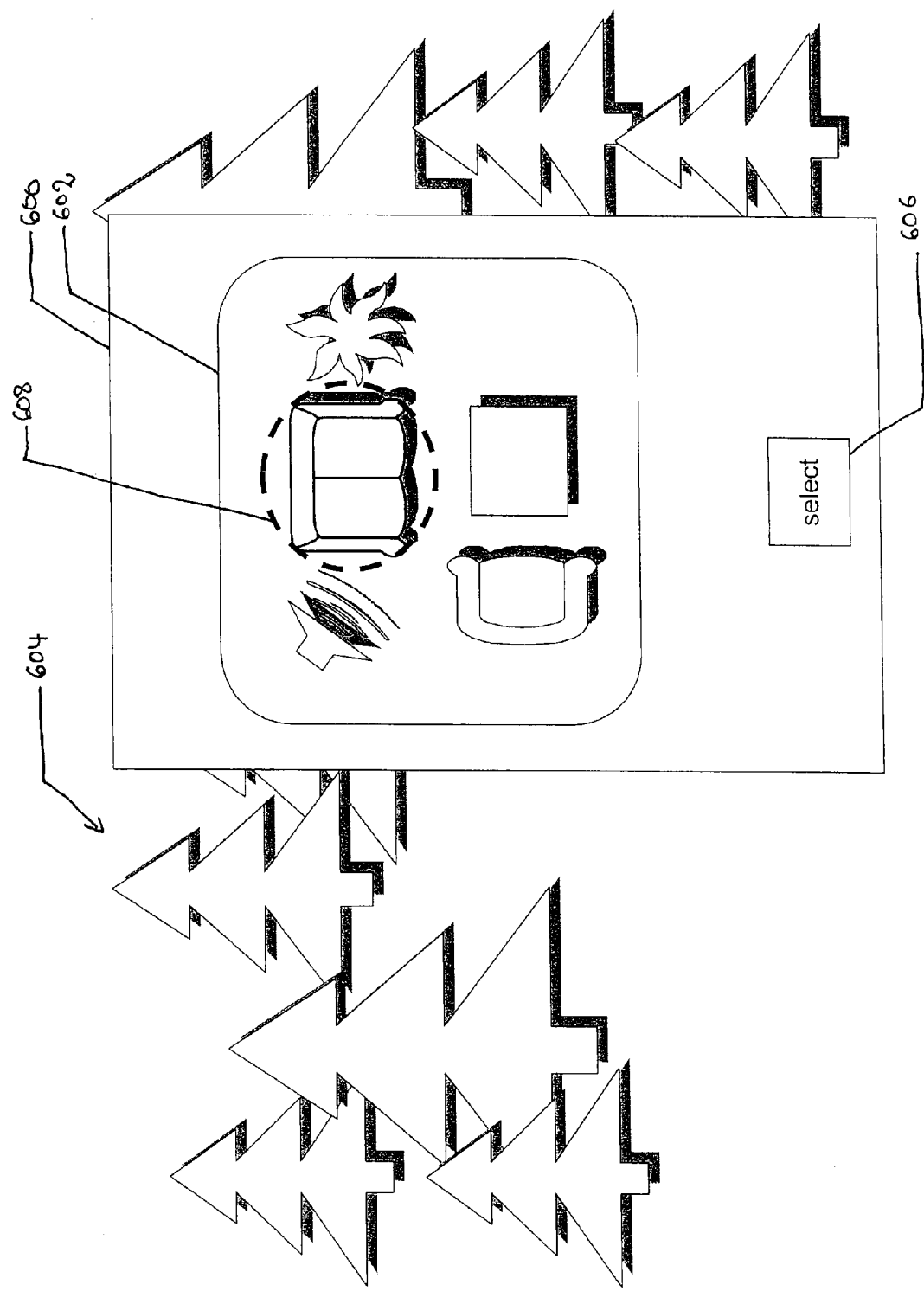
FIG. 6 illustrates an embodiment of the method of FIG. 3 which is implemented in a mobile device and allows a selection of virtual tags from a virtual scene.

This is further illustrated in FIG. 6, in which a mobile device 600 including a selection display 602 is displayed. Mobile device is adapted to be used anywhere, e.g. in an outdoor environment 604. Selection device 602 is adapted to display the part of the space which in the case depicted is a virtual environment.

For changing the displayed part of the space, i.e. for virtually moving through the virtual environment, the displayed part of the space may depend on a movement, tilt, and/or rotation of the selection device, i.e. of mobile device 600. Thus, the user is enabled to easily navigate and move through the virtual environment by changing a position, an orientation and/or by moving the mobile device 600. The location may then be determined depending on a pointing direction and/or a focusing direction of the selection device within the real world environment, but interpreted with respect to the displayed part of the virtual environment, and may be selected e.g. by pressing a select button 606.

The location that may be marked by pressing select button 606 may be visualized, e.g. highlighted by a porthole 608 or a target superimposed on selection display 602. In the example depicted, porthole 608 marks a sofa in a virtual living room scene, e.g. for selecting the playlist of relaxing music. Thus, the user may issue complex selection commands associated with virtual locations in a virtual environment just by simple movements of the mobile device 600.

Figure 7C:
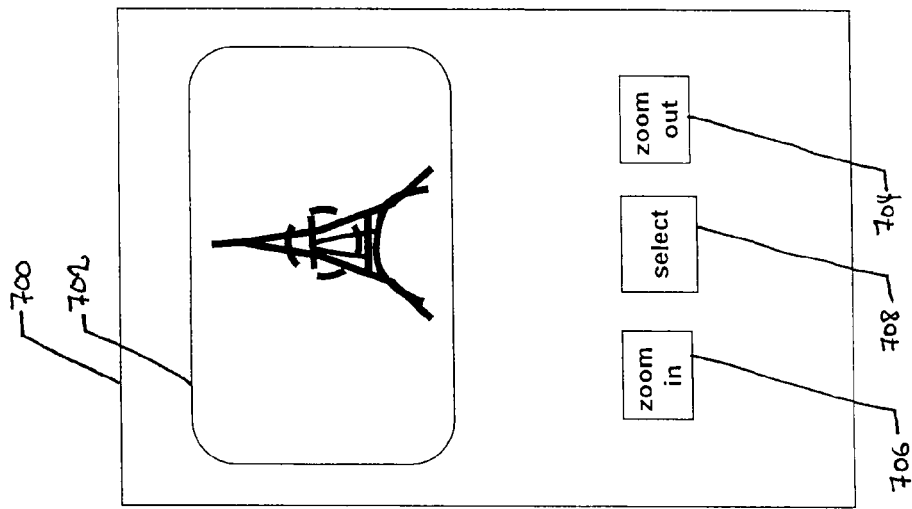
FIGS. 7a to 7c illustrate an embodiment of the method enabling a user to zoom out of and into a virtual scene for quickly changing a location and further for having access to multiple different locations.
Figure 7B:
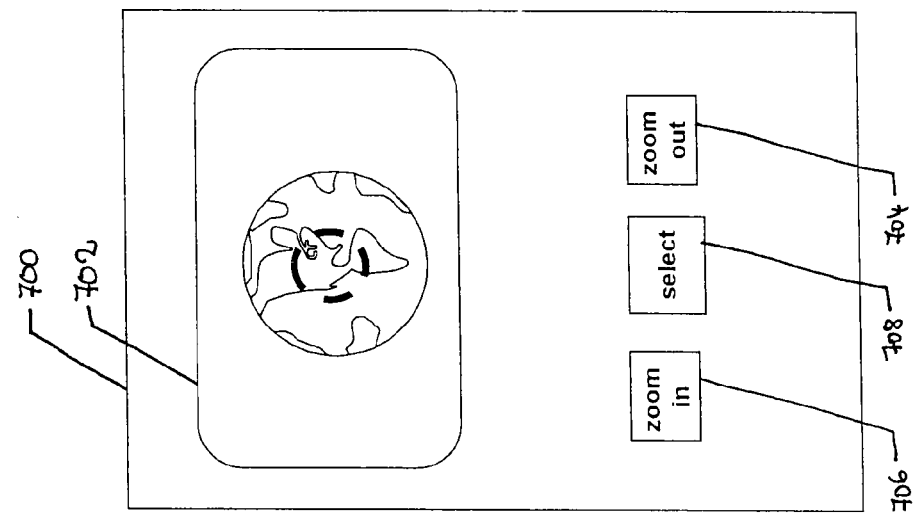
Figure 7A:
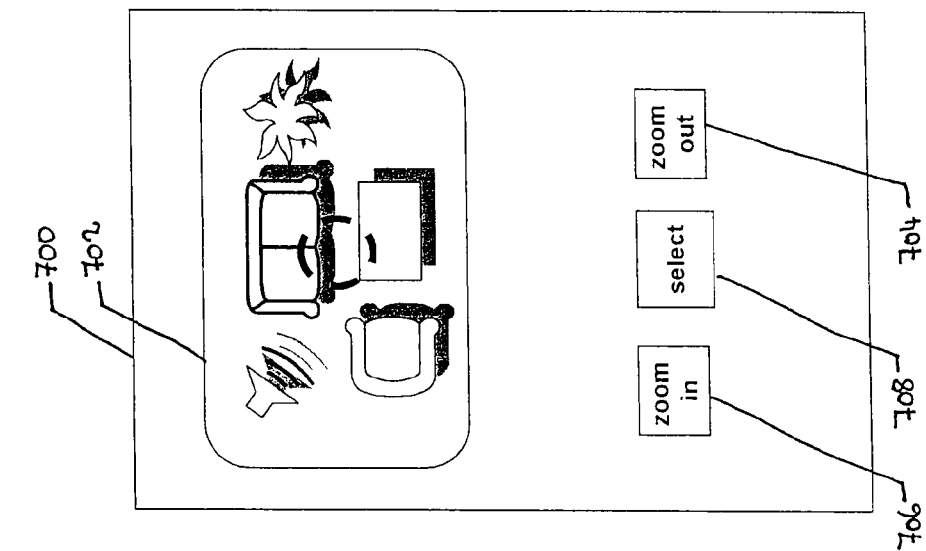

In FIGS. 7a to 7c, an embodiment of the method within a further mobile device 700 having a selection display 702 is illustrated. In the embodiment, the displayed virtual environment is changed to a further virtual environment e.g. upon a switching request.

In FIG. 7a, selection display 702 shows a part of a virtual living room environment. In FIG. 7b, it may be assumed that the user has intensely pushed a zoom out button 704, and has thus achieved a situation in which the selection display 702 shows the whole earth. Then, after having moved the earth e.g. by moving further mobile device 700, and after having pressed a zoom in button 706, the user has achieved the situation depicted in FIG. 7c, in which a monument of Paris, the Eiffel Tower, is displayed. The user may press the selection button 708 for selecting the Eiffel Tower, e.g. requesting a playback of a playlist of his collection of French chansons.

In a further embodiment enabling the user to user an "accelerated pan method", the user may issue a speed adjustment request upon which a speed of movement of the pointing direction and/or the focusing direction within the virtual environment displayed in selection display 702 may be varied. For example, respective buttons for increasing and/or decreasing the speed of movement may be provided at further mobile device 700. Further, the user may also be enabled to issue a zoom angle adjustment request for varying a virtual zoom angle of the virtual environment and/or of the focusing direction displayed in selection display 702. The functionality of the zoom angle adjustment request may correspond to the one depicted in FIGS. 7a to 7c.

Figure 8:
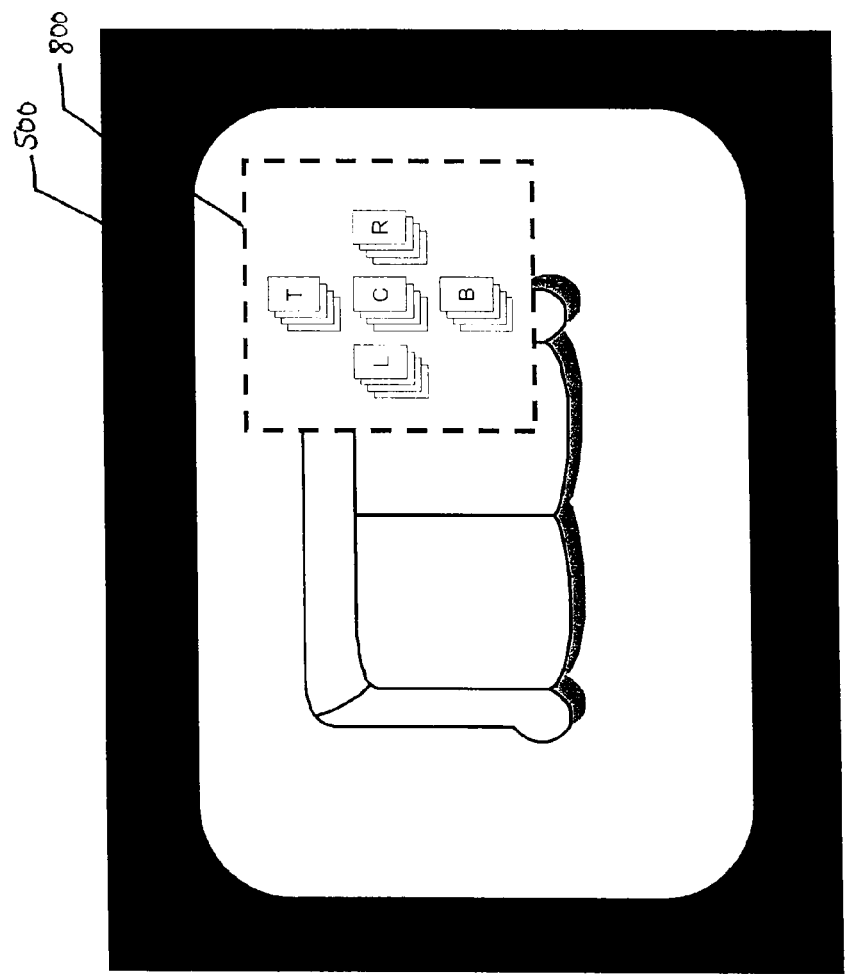
FIG. 8 illustrates an embodiment in which a set of containers for storing content items is assigned to a virtual tag, the virtual tag being assigned to a location.
Figure 8:
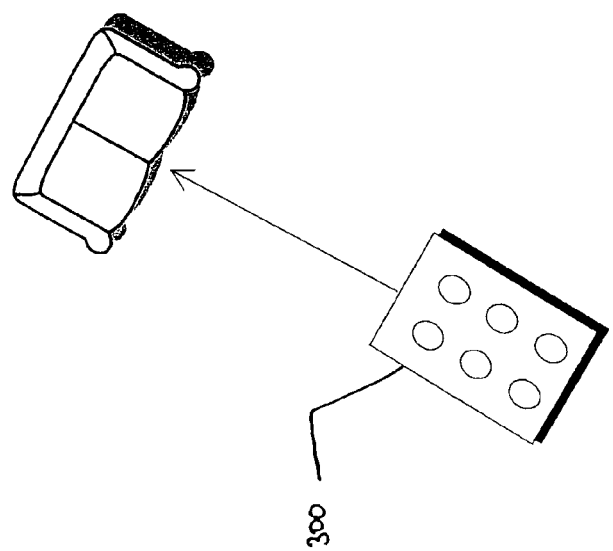

In FIG. 8, a further embodiment of the method is depicted. In the embodiment, the selected subset of content items may include container items including further content items. After a selection o the subset, at least one of the container items may be selectable for the user.

In the example, sofa 312 is assumed to be associated with a set of containers 800. After sofa 312 has been focused by selection device 300 and displayed at selection display 500, set of containers 800 may be displayed e.g. in a spatially arranged manner. The containers may thus be selectable, e.g. by slightly amending the focusing direction or selection device 300. Alternatively or in addition, the containers may also be named for being addressable, e.g. upon entering a respective name via a keyboard or a microphone. In the example, the containers may be addressable by entering characters T, L, C, R, and/or B. After having selected one of the containers, its content may be displayed for example on selection display 500 or on separate display. Thus, one single location may give access to a plurality of containers, allowing access to a multitude of content items assorted within the containers.

Figure 9:
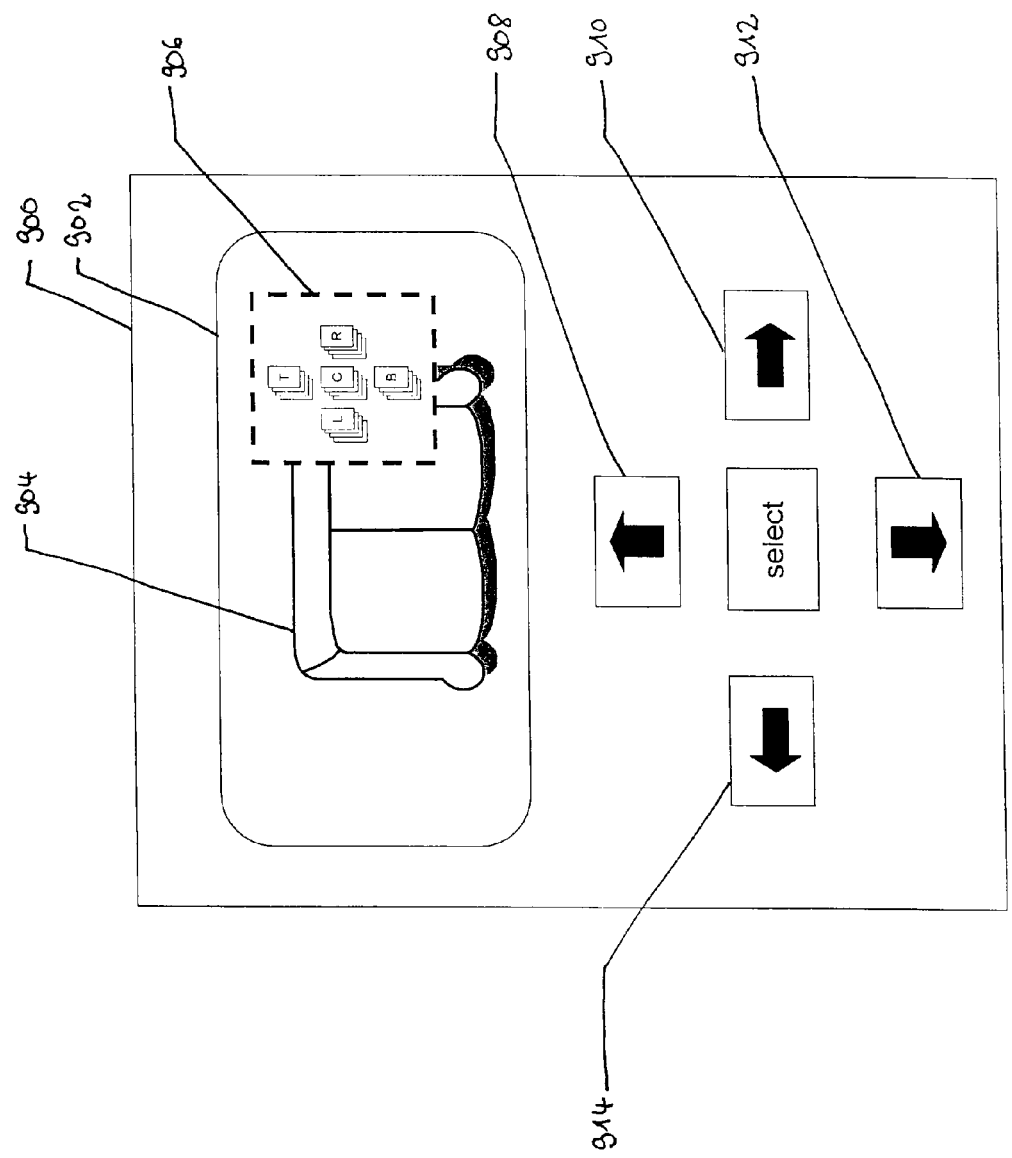
FIG. 9 illustrates an embodiment including assigned containers implemented on a mobile device.

In FIG. 9, a further embodiment of the method in which the subset of content items includes containers is illustrated. At a mobile device 900 including a selection display 902, a focused item 904 and a spatial arrangement of containers 906 associated with the item are displayed. Arrow keys 908 to 914 are provided for enabling quick navigation through and selection of the spatially arranged containers.

Figure 10:
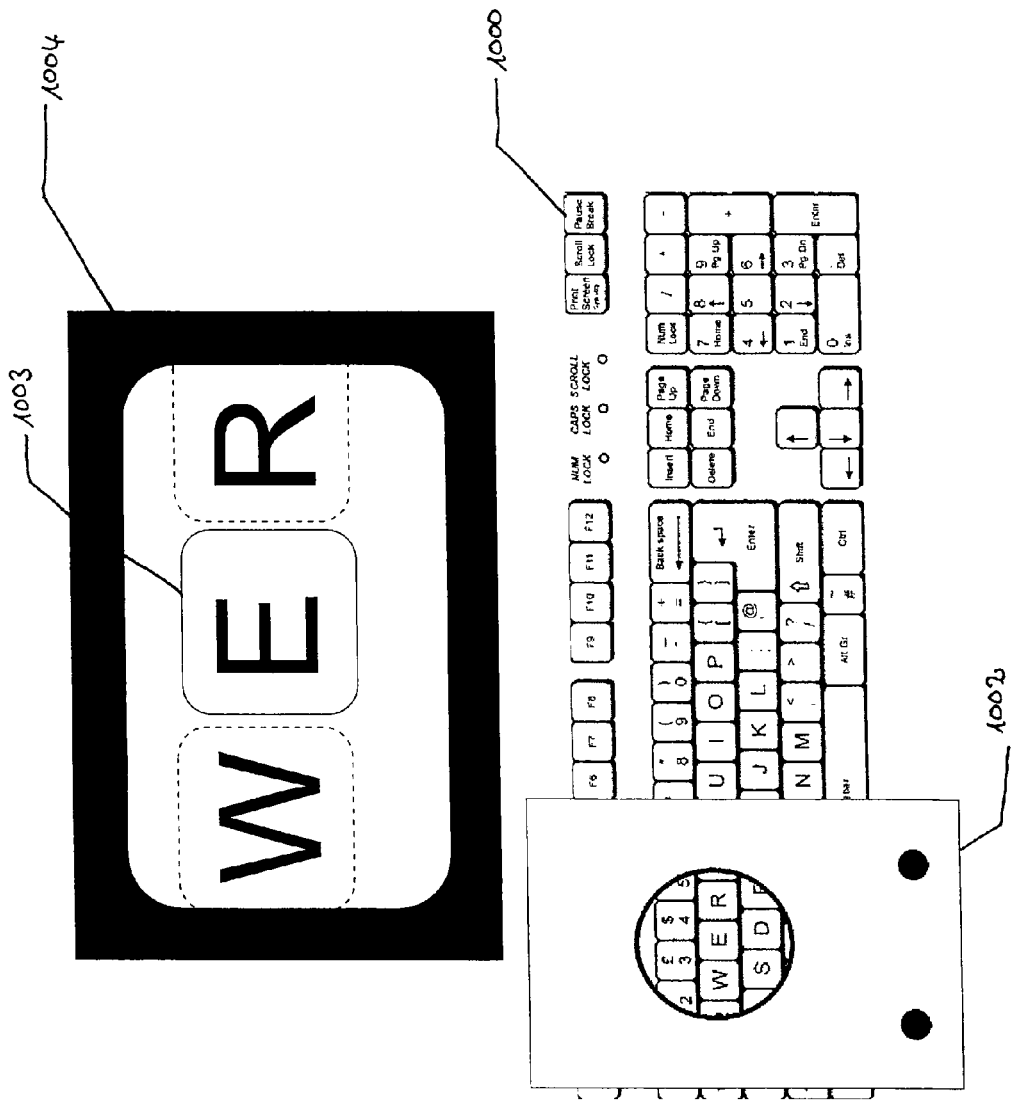
FIG. 10 illustrates an embodiment for selecting alphanumeric characters, i.e. for an easy to use text input.
Figure 11:
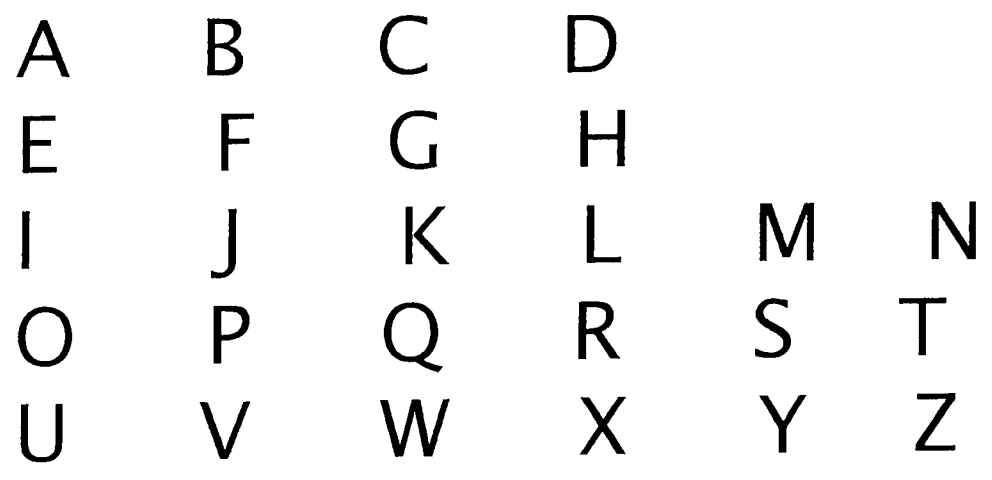

In FIG. 10, a further embodiment of the method for selecting content items is illustrated. In the embodiment, the virtual environment includes a keyboard having a two-dimensional arrangement of alphanumeric keys including one or more alphanumeric characters. The keys may be arranged in any spatial order that may be suitable for selection. For example, the keys may be arranged as on a common computer keyboard, e.g. as a "QWERTZ" or "QWERTY" distribution. Alternatively, the keys may also be spatially arranged in any other order, e.g. the order depicted in FIG. 11, which corresponds to the alphabetic order grouped by the vocals.

In the embodiment of FIG. 10, each of the alphanumeric keys may correspond to a location, which location may be associated with a virtual tag, the virtual tag being associated with a corresponding alphanumeric content item. Within the embodiment, the alphanumeric character shown on each key may be used as a virtual tag for the corresponding location. Further, the alphanumeric character may also correspond to the content associated with the virtual tag, i.e. associated indirectly with the key.

Thus, within the embodiment, no dynamic tag association corresponding to the "tag association mode" (B110, B112) of FIG. 1 is necessary. Further, no dynamic content association corresponding to the "content association mode" (B114, B116) of FIG. 1 is needed. Consequently, the embodiment may only include the "selection mode" of FIG. 1, enabling the user to comfortably select characters.

When the "selection mode" according to FIG. 1 is carried out, single characters may be selected, the single characters corresponding to the subset of content items of the set of content items referred to in FIG. 1. Thus, upon a repeated application of the processing in the "selection mode", a text string may be determined by consecutively concatenating the selected alphanumeric characters.

In the example, a keyboard arrangement 1000 is used as the space (virtual scene). A (virtual) movement of a (virtual) stencil 1002 over keyboard arrangement 1000 may dynamically follow the movement of the selection device in the real world environment. This enables a rough selection of a keyboard region where a required character 1003 may be found, which keyboard region may be displayed at a display 1004. Afterwards, a screen supported refinement may take place, e.g. for searching and selecting required character 1003 e.g. by pushing a select button at the selection device.

Figure 12:
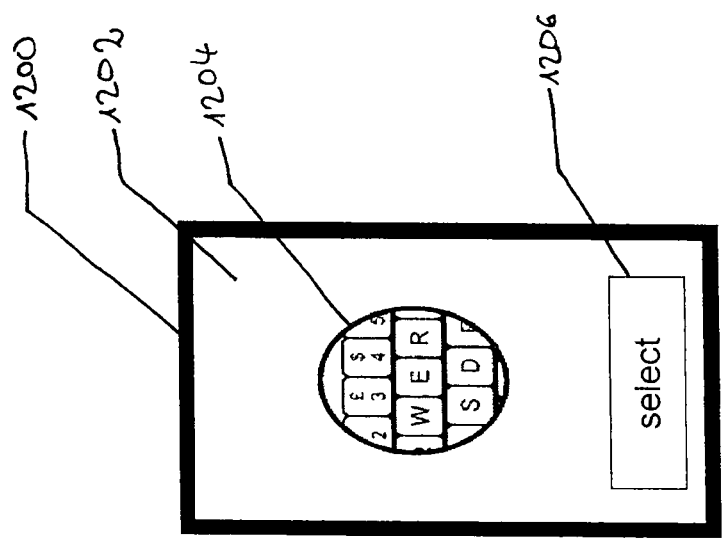
FIG. 12 illustrates a mobile device adapted to facilitate text input.

FIG. 12 illustrates an embodiment of a device for character selection. The device is a handheld text input device 1200 having a large display 1202 for displaying the alphanumeric characters arranged for example as a "QWERTY"-type keyboard. A porthole 1204 is used for selection of a keyboard region where a required character may be found. When moving text input device 1200, the shown part of the keyboard may be moved correspondingly. Thus, it might appear that a static keyboard is watched through porthole 1204, and that the object that is moving is porthole 1204 through which the user observes the keyboard. The region of the keyboard may then be selected by means of the select button 1206. Optionally, an adjustment of a zooming angle may help to rapidly move over the keyboard or to specifically select a single character.

Instead of showing a part of a keyboard on selection display 1202, only a currently selected character may be shown at the center of selection display 1202, possibly with its neighbors surrounding the key. When moving text input device 1200, the characters may not change their position, but the character itself may change. For example, the character may be blurred when a new character is focused, the new character being brightened. Thus, a soft character transition may be achieved.

This avoids a fast moving keyboard annoying the user to be displayed at selection display 1202.

Instead of selecting single characters, text input device 1200 may be moved to all characters of a word e.g. while select button 1206 is pressed. In this case, the word entered may be guessed from the moving part of text input device 1200. This may render the corresponding text input even more fast and convenient for the user.

Even though text input device 1200 is illustrated as a mobile device, the corresponding method may also be embodied in a stationary device, e.g. having a movable selection device in form of a selection handpiece.

Figure 13:
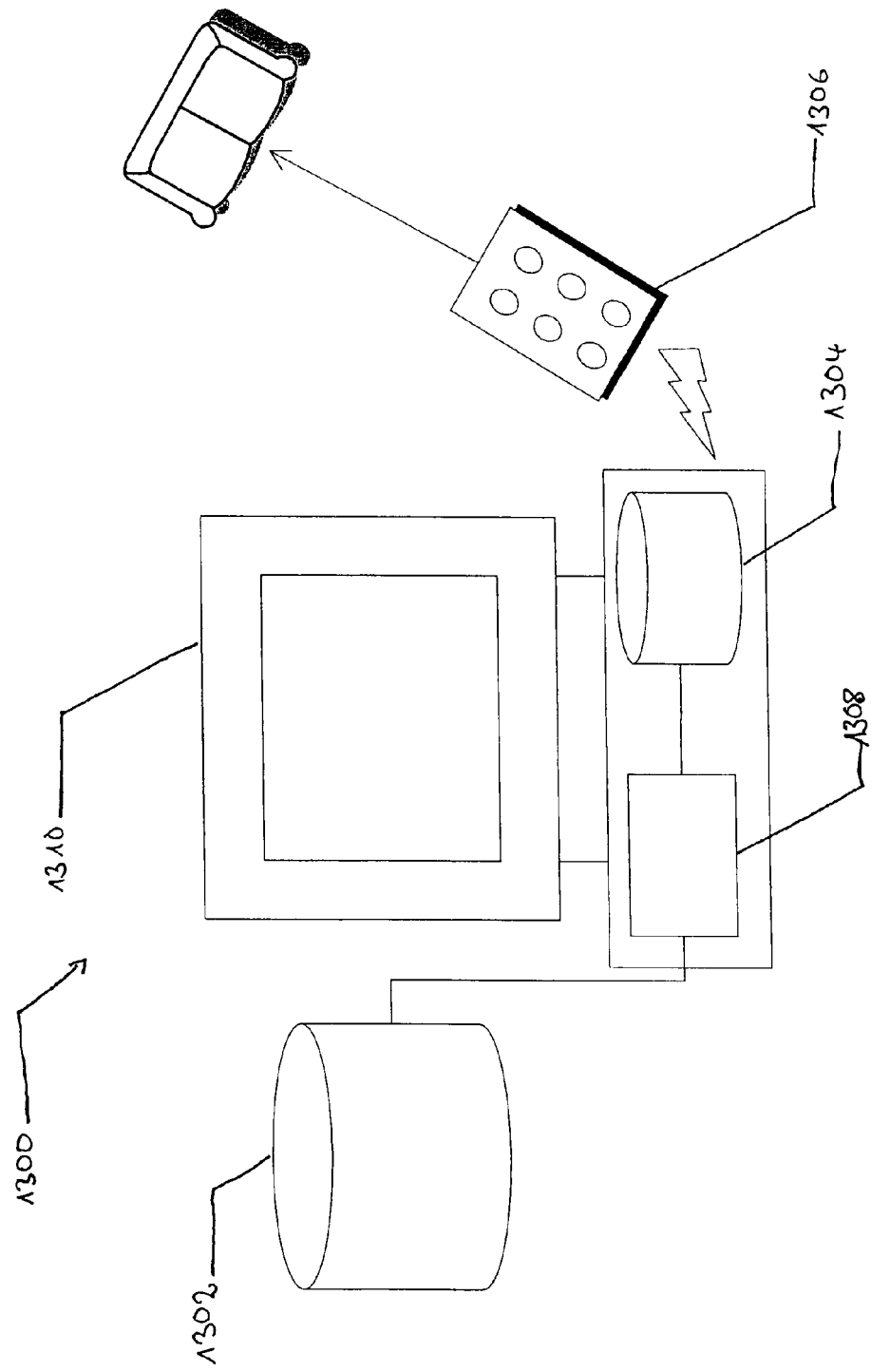
FIG. 13 illustrates an embodiment of a system for selecting content items in which a content storage unit, a tag storage unit, a content item determination unit and a location identifying unit are distributed over plural devices.

In FIG. 13, an embodiment of a system 1300 for selecting content items is illustrated. System 1300 includes a content storage unit 1302 adapted to store a set of content items. For example, content storage unit may be a personal and locally located storage. Further, content storage unit 1302 may also be a remotely located content storage, which may be accessible via a network such as the internet. For example, content storage unit 1302 may be remotely located music data base or a remotely located video provider, providing for example an internet television channel.

Further, system 1300 may include a tag storage unit 1304 adapted to store a set of virtual tags and information associating a respective one of the set of virtual tags with a respective subset of the set of content items. This information may for example be given in form of linking information, associating with the virtual tag for example with a set of retrieval addresses that can be used for retrieving the content items. Additionally, further information associating a respective one of the virtual tags with a respective location may be included in tag storage unit 1304. Tag storage unit 1304 may for example be organized in form of a relational database.

Additionally, system 1300 may include a location identifying unit 1306, which may be adapted to identify a location in a real world environment and/or in a virtual environment as already described in the above. The location may thus depend on at least one of a position, an orientation and a movement of a selection handpiece, the selection handpiece possibly including location identifying unit 1306.

Further, a content item determination unit 1308 may be provided within system 1300. Content item determination unit 1308 may be adapted to select a subset of content items e.g. from content storage unit 1302 depending on a location identified by location identifying unit 1306. The subset of content items to be selected may be the one associated with a virtual tag, the virtual tag being associated with the location identified by location identifying unit 1306.

Still further, system 1300 may include at least one rendering device 1310 adapted to render content items retrieved from content storage unit 1302.

Figure 14:
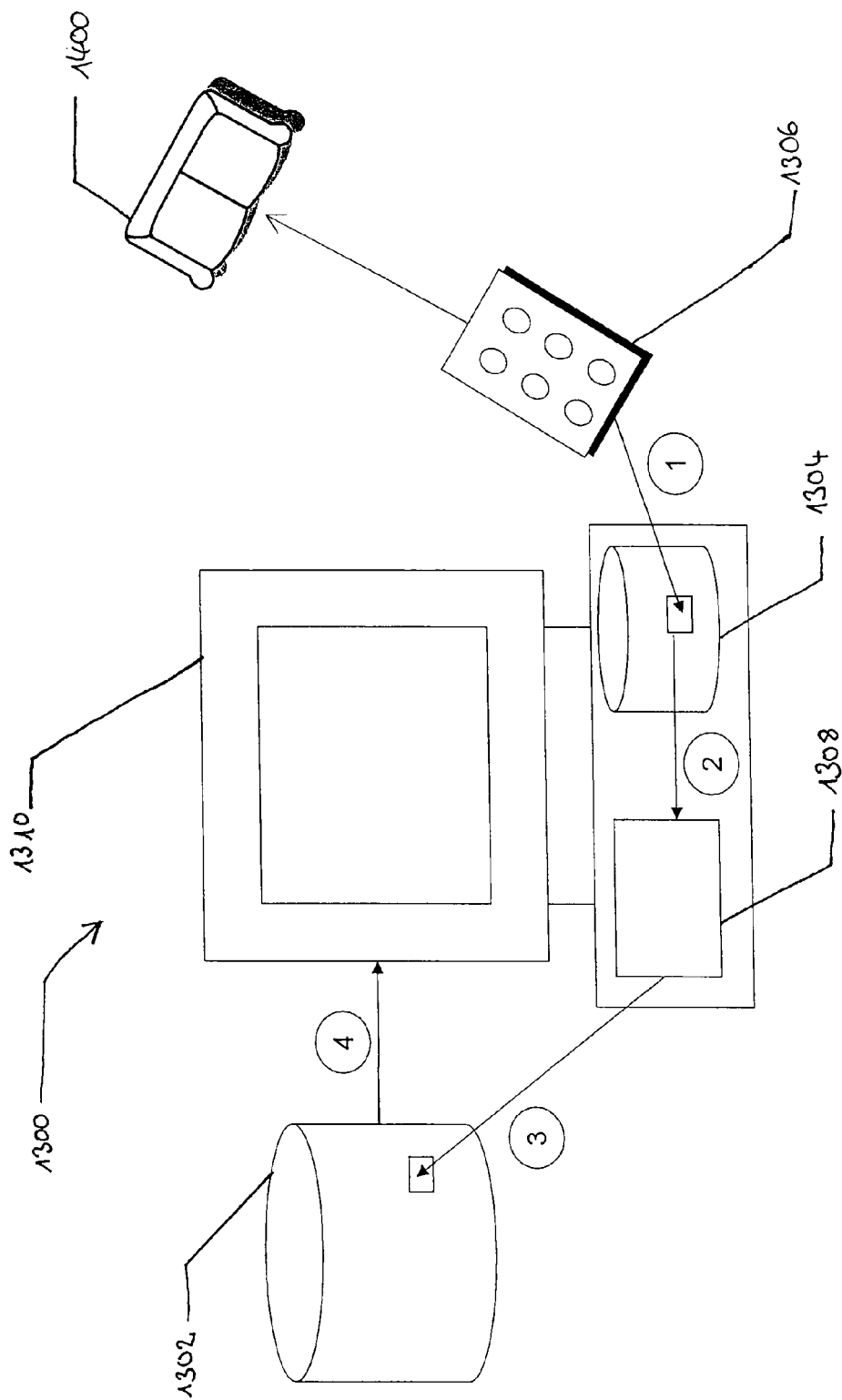
FIG. 14 illustrates a use case for the system depicted in FIG. 13.

FIG. 14 illustrates a use case of system 1300. In the use case, the user may be supposed to have selected, e.g. by a movement of the selection handpiece, a location with location identifying unit 1306. The location may correspond to a sofa 1400 towards which the selection handpiece is directed. In a first step, the location identified by location identifying unit 1306 is communicated to tag storage 1304, in which a virtual tag is associated with the identified location. The virtual tag is communicated, in a second step, to content item determination unit 1308 for determining a subset of content items to be retrieved. For example, a retrieval address e.g. in form of a uniform resource identifier (URI) may be determined for each of the content items of the subset. In a third step, the content items to be retrieved may be accessed at content storage unit 1302 e.g. by means of the retrieval address. In a fourth step, these content items may be transferred to rendering device 1310, e.g. a television set or HiFi device.

Figure 15:
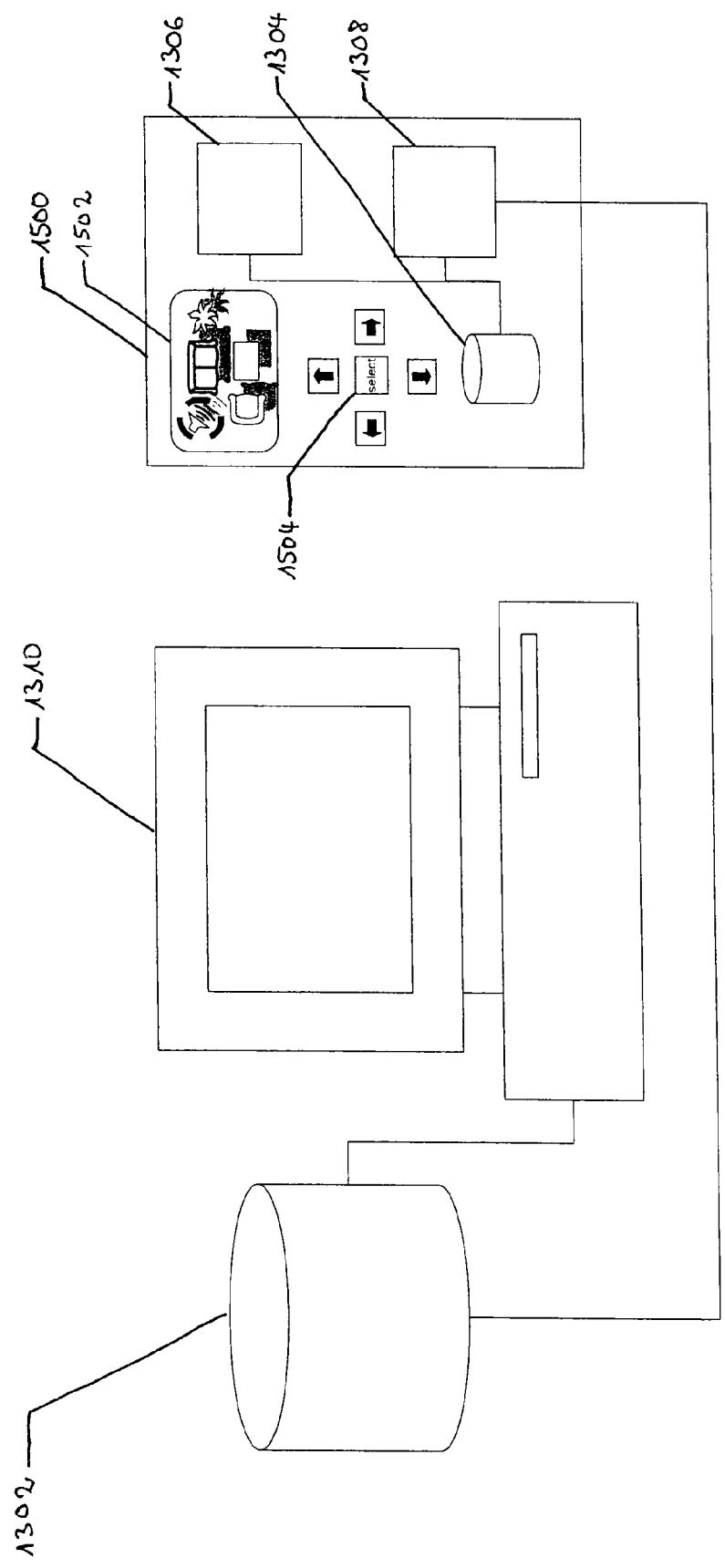
FIG. 15 illustrates a further embodiment of a system for selecting content items in which the content items to be selected may be determined within a selection device.

In FIG. 15, a further embodiment of a system for selecting content items is illustrated. The embodiment includes rendering device 1310 and content storage unit 1302 corresponding to those shown in FIG. 13. However, the embodiment further includes a selection device 1500 including location identifying unit 1306, tag storage unit 1304 and content item determination unit 1308. Selection device 1500 further includes a selection display 1502 for displaying e.g. a real world object to be selected or a virtual scene of the space, and further selection keys 1504 for facilitating navigation and selection.

It should be noted that within selection device 1500, all actions to be performed e.g. in the "selection mode" (B102 to B108) of FIG. 1 may be realized. After having determined the subset of content items to be retrieved, a command may be issued to content storage unit 1302 giving instruction to retrieve and transmit the content items to rendering device 1310. Content storage 1302 and rendering device 1310 may therefore be common devices which may be controlled by selection device 1500 in a smart manner.

Figure 16:
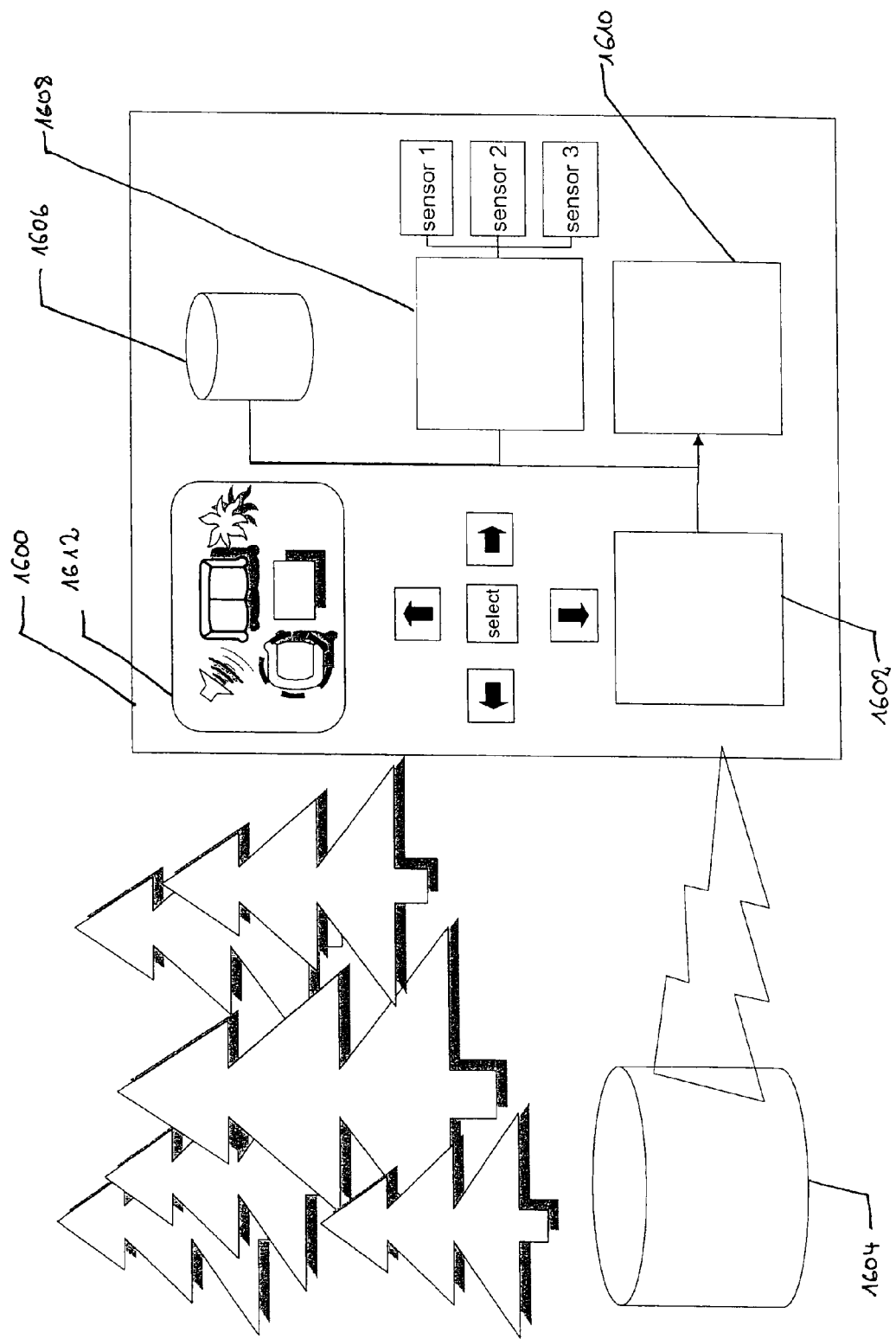
FIG. 16 illustrates a further embodiment of the system for selecting content items including a mobile device.

FIG. 16 illustrates a mobile device 1600 for selecting content items. Mobile device 1600 may include a content storage access unit 1602 adapted to access a set of content items stored in a remotely located content storage 1604, which may be accessible via a wireless network. Further, mobile device 1600 may include a tag storage unit 1606, a location identifying unit 1608 having access to sensors 1 to 3 e.g. for measuring accelerations in different directions, a content item determination unit 1610, a selection display 1612 as well as keys for facilitating e.g. navigation through the space.

Thus, mobile device 1600 may include all components necessary for carrying out the embodiment of the method as illustrated in FIG. 1. Further, mobile device 1600 does not need a large storage capacity since content items may be retrieved from content storage 1604. Further, since tag storage unit 1606 includes all necessary associations e.g. in form of linking information, it is not necessary to provide mobile device 1600 with a large amount of processing power. Thus, all necessary actions may be performed in a relatively small and lean device which may e.g. be configured as a mass product.

Figure 17:
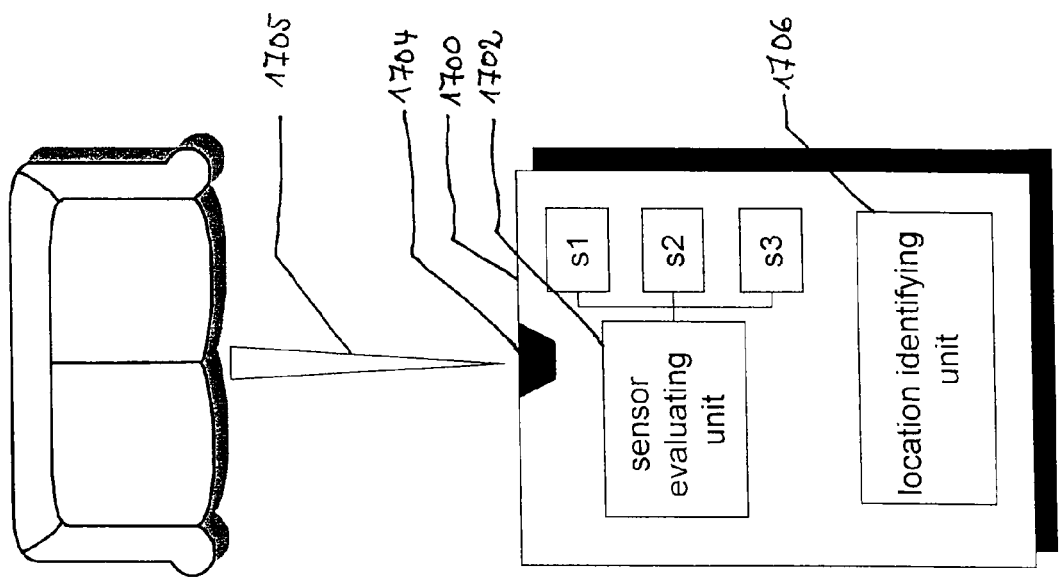
FIG. 17 illustrates a pointing device having a light beam emitting unit, the pointing device being adapted to select a location.

In FIG. 17, a further embodiment of a device for selecting content items is illustrated. A selection handpiece 1700 includes sensors s1 to s3 and a sensor evaluating unit 1702 for determining at least one of a position, an orientation or a movement of selection handpiece 1700 within the real world environment. Further, selection handpiece 1700 may include a light beam emitting unit 1704 adapted to emit a light beam 1705 for illuminating a location within the real world environment. Further, a location identifying unit 1706 adapted to identify the location may also be included.

Selection handpiece 1700 may thus form an independent pointing device which may be adapted to provide, e.g. via a wireless connection, information concerning an identified location, the location having been illuminated by light beam 1705.

The invention claimed is:
1. A method for selecting content items, the method comprising:
 determining, by a selection device held by a user, an object in a space according to at least one of a position, an orientation or a movement of the selection device in a real world environment;

determining, by the selection device, a virtual tag included in a set of virtual tags as a selected virtual tag, the selected virtual tag being associated with the determined object;

selecting, by the selection device, a content item that corresponds to the selected virtual tag, the content item being multimedia data stored in an electronic storage; and commanding, by the selection device, an electronic device in the real world environment to execute the content item.

2. The method according to claim 1, further comprising:
associating, by the selection device, a second virtual tag with a second object in the space, the second object being determined according to at least one of a second position, a second orientation or a second movement of the selection device in the real world environment.

3. The method according to claim 1, further comprising:
selecting, by the selection device, a second content item; and associating, by the selection device, the second content item with a second virtual tag of the set of virtual tags.

4. The method according to claim 1, wherein
the space is the real world environment or is a virtual environment defined in an electronic storage.

5. The method according to claim 1, wherein
the object is determined in the real world environment according to a pointing direction or a focusing direction of the selection device, and the selection device includes a light beam generator for illuminating the location in the pointing direction or in the focusing direction.

6. The method according to claim 1, wherein
the selection device includes a selection display for displaying at least a part of the space and for marking the object within the displayed part of the space, the displayed part of the space and the marked object depending on the movement, the tilt or the rotation of the selection device, and the object is determined depending on a pointing direction or a focusing direction of the selection device with respect to the displayed part of the space.

7. The method according to claim 1, wherein the selection device includes a display.

8. The method according to claim 6, wherein
the space is a virtual environment defined in an electronic storage, and the method further comprises:
upon a switching request received by the selection device, a second virtual environment is displayed within the selection display instead of the space, upon a speed adjustment request received by the selection device, a speed of movement of the pointing direction or the focusing direction within the space displayed in the selection display is varied, and upon a zoom angle adjustment request received by the selection device, a virtual zoom angle of the space or of the focusing direction displayed in the selection display is varied.

9. The method according to claim 1, wherein the selection device outputs an optic, acoustic or haptic notification when a particular object associated with a respective virtual tag is identified by the position, the orientation or the movement of the selection device.

10. The method according to claim 1, wherein, when the selected content item is multimedia data that includes a plurality of additional content items, the content item is selectable by the user on the selection device by the user pressing a respective key of the selection device.

11. The method according to claim 10, wherein the additional content items included in the selected content item are displayed in a spatial arrangement at a result display, the spatial arrangement allowing a further selection of one of the additional content items by navigation with arrow keys of the selection device, and the result display is included in the selection device.

12. The method according to claim 5, wherein
the virtual environment includes a keyboard having a two-dimensional arrangement of alphanumeric keys including one or more alphanumeric characters, each of the alphanumeric keys corresponding to a location associated with a virtual tag, the virtual tag being associated with a corresponding alphanumeric content item, and the method further comprises determining, by the selection device, a text string depending on a sequence determined by concatenating consecutively the selected alphanumeric content items.

13. The method according to claim 1, wherein
the content item of the set of content items includes an instruction to control the electronic device, and the selection device commands the electronic device to execute the content item according to the instruction.

14. The method according to claim 13, wherein the instruction includes information on a user profile to be activated at the electronic device.

15. The method according to claim 1, wherein the virtual tags associated with the object further depend on information related to a user or to the real world environment.

16. A system for selecting content items, the system comprising:
a content storage that stores content items, each of the content items being multimedia data and the content storage being an electronic storage;

a tag storage that stores a set of virtual tags and information associating each virtual tag of the set of virtual tags with a respective content item stored in the content storage and with a respective object in a space; and a selection device that, when held by a user,
identifies an object in the space, the space being a real world environment or a virtual environment, the identification of the object according to at least one of a position, an orientation and a movement of the selection device;

determines a virtual tag included in the set of virtual tags as a selected virtual tag, the selected virtual tag being associated with the determined object;

selects a content item that corresponds to the selected virtual tag, the content item being stored in the content storage; and commands an electronic device in the real world environment to execute the content item.

17. The system according to claim 16, further comprising the electronic device, wherein
the electronic device accesses the content storage, and the selection device transmits, along with a command to execute the content item, information that identifies the selected content item to the electronic device.

18. A device for selecting content items, the device comprising:
a network interface that accesses, via a wireless network, a set of content items stored in a remote storage, each of the content items being multimedia data and the remote storage being an electronic storage;

a tag storage that stores a set of virtual tags and information associating each virtual tag of the set of virtual tags with a respective content item stored in the remote storage and with a respective object in a space; and circuitry configured to
- when the device is held by a user, identify an object in the space, the space being a real world environment or in a virtual environment, the identification of the object according to at least one of a position, an orientation and a movement of the device;
- determine a virtual tag included in the set of virtual tags as a selected virtual tag, the selected virtual tag being associated with the determined object;
- select a content item that corresponds to the selected virtual tag, the content item being stored in the remote storage; and
- command an electronic device in the real world environment to execute the content item.

19. The device according to claim 18, wherein the tag storage is located within the device.

20. The device according to claim 18, wherein the device is a mobile device.

21. The device according to claim 18, further comprising a light beam emitter that illuminates the object, the object being situated in the real world environment.

22. A pointing device comprising:
- a selection handpiece; and
- circuitry configured to
    - identify an object in a real world environment, the identification of the object according to on at least one of a position, an orientation and a movement of the selection handpiece in the real world environment;
    - determine a virtual tag associated with the identified object;
    - select a content item that corresponds to the virtual tag, the content item being multimedia data stored in a remote electronic content storage; and
    - command an electronic device in the real world environment to execute the content item, wherein
- the selection handpiece includes a light beam emitter that illuminates the object.

* * * * *